United States Patent [19]

Pruszenski, Jr.

[11] Patent Number: 4,492,859
[45] Date of Patent: Jan. 8, 1985

[54] DUAL AXES MULTIPLE PRISM OPTICAL SYSTEM FOR AZIMUTH AND ELEVATION VARIATION DETECTION

[75] Inventor: Anthony S. Pruszenski, Jr., Newbury, Mass.

[73] Assignee: The Charles Stark Draper Laboratory, Inc., Cambridge, Mass.

[21] Appl. No.: 445,556

[22] Filed: Nov. 30, 1982

[51] Int. Cl.³ .............................................. G01C 1/02
[52] U.S. Cl. ...................................... 250/216; 33/281; 250/227; 350/299; 356/147
[58] Field of Search ................. 250/227, 216; 356/138, 356/147, 148, 152; 350/299; 33/281

[56] References Cited

U.S. PATENT DOCUMENTS

| | | |
|---|---|---|
| 3,006,236 | 10/1961 | Michaud .......................... 356/147 |
| 3,137,794 | 6/1964 | Seward . |
| 3,156,755 | 11/1964 | Collyer . |
| 3,232,164 | 2/1966 | Kern et al. . |
| 3,241,430 | 3/1966 | Kulick . |
| 3,296,921 | 1/1967 | Polster . |
| 3,302,512 | 2/1967 | Davidson . |
| 3,351,767 | 11/1967 | Suiter . |
| 3,458,704 | 7/1969 | Cath . |

FOREIGN PATENT DOCUMENTS 219221 of 1968 U.S.S.R. ............................ 356/147

OTHER PUBLICATIONS

Seward, "A Photoelectric Solid-State Angle-Sensing System;" Instrumentation Laboratory MIT, Jan. 1961; pp. 1–31.
Seward, "A Sunfinder for an Interplanetary Vehicle;" Instrumentation Laboratory MIT, Oct. 1960; pp. 1–7.
Karthas, "IR Refractosyn: A 10.6 Micron Angle Sensor;" The Charles Stark Draper Laboratory, Inc., Mar. 1974; pp. 1–51.

Primary Examiner—Edward P. Westin
Attorney, Agent, or Firm—Weingarten, Schurgin, Gagnebin & Hayes

[57] ABSTRACT

A dual axes multiple prism optical system is disclosed having first and second pairs of 45°–90° prisms mounted on orthogonal substrates operative in one embodiment as an autocollimator and in another embodiment as a directionally sensitive light detector. In both embodiments, the first prism pair provides an azimuthal variation detection capability and the second prism pair provides an elevational variation detection capability. The prisms are so positioned on the substrates that light traveling in a reference direction is incident to the prisms at the critical angle and is totally internally reflected therethrough. Light traveling in a direction which deviates about either the elevational or the azimuthal planes about the reference direction is incident on corresponding ones of the prisms at below the critical angle and is refracted therethrough and collected by an end array matrix of fiberoptic cables mounted to the prisms. In the autocollimator embodiment, an intensity stabilized light source and intensity detector is mounted to one of the substrates. An intensity control is connected between the source and the detector operative to stabilize the intensity of the collimated light source against variations occasioned by such factors as fluctuating atmospheric or optical media transmission characteristics, and light source aging. The dual axes multiple prism optical system has a folded optical path and a geometry which provides a compact and rugged construction.

8 Claims, 8 Drawing Figures

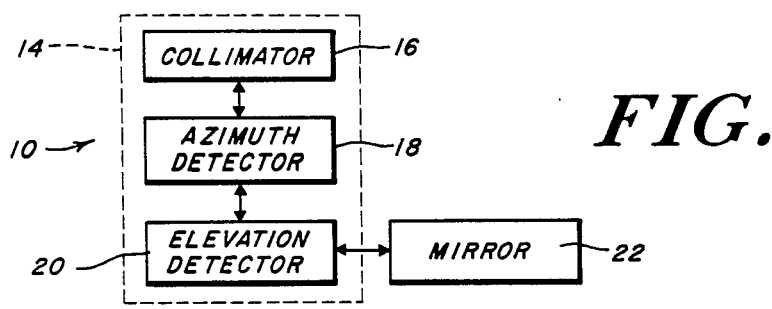
FIG. 1
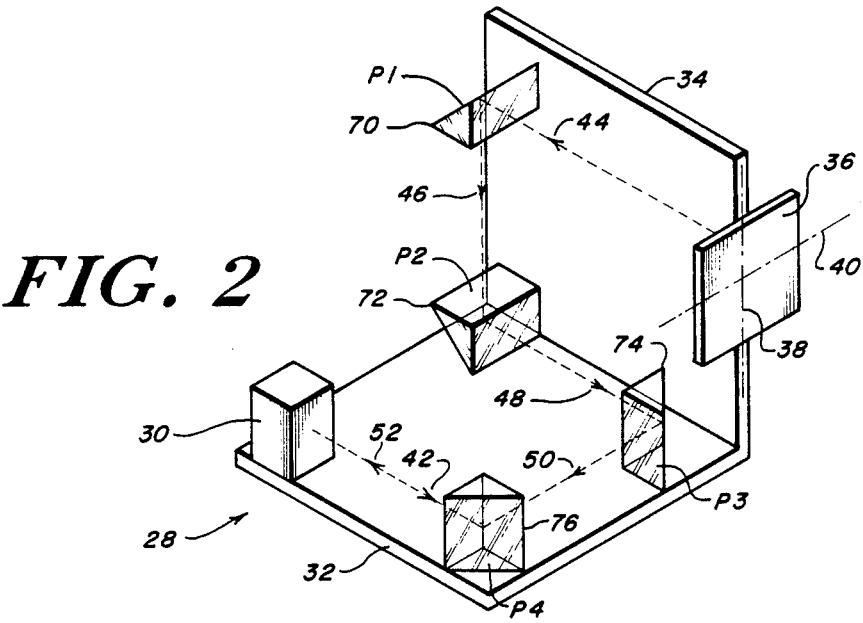
FIG. 2
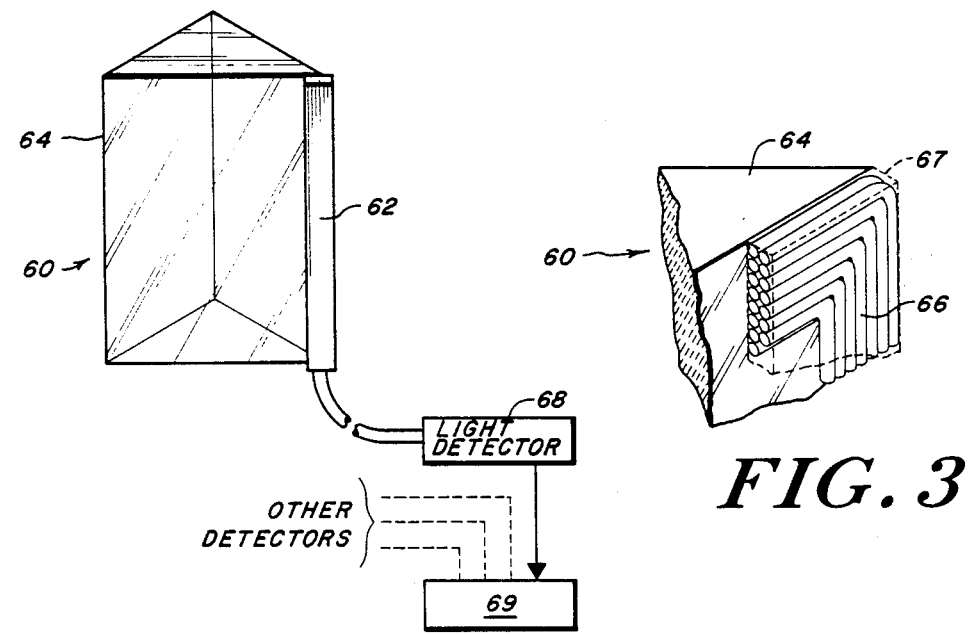
FIG. 3A
FIG. 3B 4,492,859

DUAL AXES MULTIPLE PRISM OPTICAL SYSTEM FOR AZIMUTH AND ELEVATION VARIATION DETECTION

FIELD OF THE INVENTION

This invention is drawn to the field of optics, and more particularly, to a novel dual axes multiple prism optical system for use as an autocollimator and a directionally sensitive light detector.

BACKGROUND OF THE INVENTION

A ray of light in a first medium of high refractive index directed toward a second medium of a lower index passes into the second medium with refraction, provided the angle of incidence is not too large. As the angle of incidence of the ray increases, a critical angle of incidence is reached at which the ray does not pass into the second medium but is totally reflected at the surface of separation. In general, total reflection occurs at the boundary separating two media having different refractive indices, when any ray in the medium of higher index is directed toward the other medium at an angle of incidence greater than the critical angle.

Seward, U.S. Pat. No. 3,137,794, incorporated herein by reference, provides a directionally sensitive light detector based on this phenomena in which an isosceles prism having isosceles angles custom ground to the critical angle for light of a given wavelength is provided with first and second photocells respectively mounted in a position to intercept light refracted through the side faces of the prism. Light normally incident to the hypotenuse strikes the side face of the prism at the critical angle and is totally internally reflected. Light incident at an angle other than normal to the hypotenuse face strikes one of the side faces at an angle of incidence less than the critical angle whereby the light is refracted through that side face and onto the corresponding photocell. A differential circuit is responsive to the photocell signals and is operative to provide an indication of the direction of the light source off of the optical null of the prism. The presently known directionally sensitive light detectors, however, are comparatively expensive to manufacture, or to procure, since prisms ground and polished at the critical angle for a given wavelength are not commercially produced in quantity. Furthermore, when used as an autocollimator, the known systems produce an undesirable sensitive variation with changes in reflecting surface position, in focus, and with changes in optical and atmospheric parameters.

SUMMARY OF THE INVENTION

The novel multiple prism optical system of the present invention utilizes commercially available 45°-90° prisms. In one embodiment, the multiple prism optical system of the invention is operative to provide an autocollimator. In another embodiment, the multiple prism optical system of the invention is operative to provide a directionally sensitive light detector. In both embodiments, first and second pairs of 45°-90° prisms are mounted to orthogonal substrates such that the first prism pair provides an azimuthal variation detection capability and the second prism pair provides an elevational variation detection capability. Individual ones of the 45°-90° prisms mounted to the first substrate provide an indication of light deviation to respective half planes of the azimuthal plane of the optical null and individual ones of the prisms mounted to the orthogonal second substrate provide an indication of light deviation to respective half planes of the elevational axis of the optical null of the instrument. A light collection subsystem having an end array matrix of fiberoptic cables is mounted to each of the prisms to collect the rectangular pencil of light refracted therethrough. The ends of the fiberoptic cables are constrained to lie in a plane orthogonal to the hypotenuse face of the prisms.

In the autocollimator embodiment, an intensity stabilized collimated light source and intensity detector is mounted to one of the substrates. A feedback loop is connected between the source and the detector and is operative to stablize the intensity of the collimated light source against changes occasioned by such factors as fluctuating atmospheric transmission characteristics, light source aging, and variations of the transmission characteristics of the optical media.

The novel multiple prism optical system of the present invention has a folded optical path which provides a very compact instrument. The geometry and physical characteristics of the elements of the system are such as to provide a rugged construction suitable for high stress environments.

BRIEF DESCRIPTION OF THE DRAWINGS

The invention will become better understood by referring to the following exemplary and non-limiting description of the preferred embodiments and to the drawings, wherein:

FIG. 1 shows a block diagram of the multiple prism optical system of the present invention in an autocollimator mode;

FIG. 2 shows a simplified perspective view of the multiple prism optical system of the present invention in the autocollimator mode;

FIG. 3 shows in FIG. 3A an enlarged isometric view of a 45°-90° prism provided with the light collection subsystem of the present invention and shows in FIG. 3B an enlarged and fragmentary detailed view of the light collection subsystem of FIG. 3A;

DETAILED DESCRIPTION OF THE PREFERRED EMBODIMENT

Figure 4:
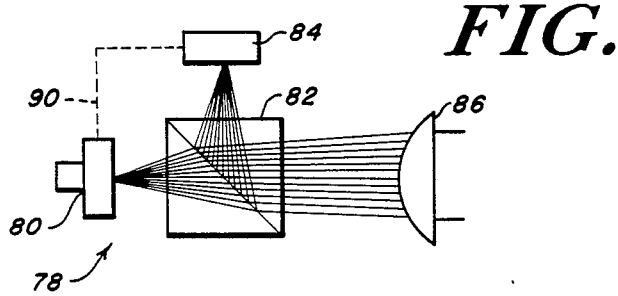
FIG. 4 shows a schematic diagram of the intensity stabilized light source and intensity detector of the embodiment of FIG. 1.

Referring now to FIG. 1, generally designated at 10 is a block diagram of an autocollimator embodiment of the dual axes multiple prism optical system of the present invention. The system 10 includes a first platform generally designated by the dashed box 14 having mounted thereto an intensity stabilized collimator 16, an azimuth detector 18, and an elevation detector 20. A mirror 22, or any other suitably reflecting surface, is in spaced apart relation to the platform 14. The collimator 16 provides a collimated light source whose intensity is stabilized against variation occasioned by such factors as a fluctuation in the atmospheric and in the optical media transmission parameters, and by aging of the light source. The azimuth detector 18 of the present invention is responsive to rotations of the reflective surface 22 about an azimuthal axis 24 and the elevation detector 20 of the present invention is responsive to rotations of the reflective surface 22 about an elevational axis 26 orthogonal to the axis 24. Both the azimuth detector 18 and the elevation detector 20 provide separate signals respectively indicative of plus and minus variation about the azimuthal and elevational axes.

Referring now to FIG. 2, generally designated at 28 is a simplified perspective view of the dual axes multiple prism optical system of the present invention in an autocollimater mode. The system 28 includes an intensity stabilized collimated light source and detector 30, described below, fixably mounted to a first substrate 32 that is orthogonally fastened to a second substrate 34. A mirror 36 rotatable about orthogonal axes 38 and 40 is positioned in spaced-apart relation to the substrate 34 nominally with its plane perpendicular to the plane of substrate 34. Light normally incident thereon is reflected in the direction of a ray 44. The detector and source 30 provide a collimated light beam in the direction of a ray 42. A first 45°-90° prism P1 is positioned in the optical path of the ray 44 and is rotated such that the ray 44 is incident to the normal of the hypotenuse face of the prism P1 at the critical angle for the particular wavelength of light being produced by the intensity stabilized and collimated light source 30. The rotation of the prism P1 can be accomplished by any suitable means such as by a micromanipulator. The prism rotated to the critical angle is fastened to the substrate 34 adhesively or by any other suitable means.

The rotated and fastened prism P1 serves to deviate the ray 44 by total internal reflection into the direction of a ray 46. A second 45°-90° prism P2 is positioned in the optical path of the ray 46 in spaced apart relation to the prism P1 and is similarly rotated until the ray 46 is incident to the normal of the hypotenuse face of the prism P2 just at the critical angle. The prism P2 is likewise adhesively fastened to the substrate 34. Since the ray 46 is incident upon the hypotenuse face of the prism P2 at an angle to the normal thereof which is equal to the critical angle for the wavelength of the light, the prism P2 deviates the ray 46 by total internal reflection in the direction of a ray 48. The prisms P1 and P2 are so set relative to each other that any vertical deviation in the rays causes a loss of total internal reflection on one or the other prism but not both.

A third 45°-90° prism P3 is positioned in the optical path of the ray 48 in spaced apart relation to the prism P2. The prism p3 is controllably rotated until the angle of the ray 48 incident to the normal of the hypotenuse face thereof is just equal to the critical angle. The rotated prism P3 is likewise adhesively fastened to the substrate 32 which preferably is orthogonally fastened to the substrate 34.

Since the ray 48 is incident to the normal of the hypotenuse face of the prism P3 at an angle of incidence to the normal thereof which is equal to the critical angle, the prism P3 deviates the ray 48 in the direction of a ray 50 out of a plane parallel to the substrate 34 into a plane parallel to the substrate 32. In a like fashion, a fourth 45°-90° prism P4 is mounted in spaced apart relation to the prism P3 in the optical path of the ray 50 at an angle whereby the ray 50 is incident to the normal of the hypotenuse face of the prism P4 at the critical angle so that the ray 50 is deviated in the direction of the ray 52 by total internal reflection. Prisms P3 and P4 are so set relative to each other so as to provide for horizontal deviations the same loss of reflection provided by prisms P1 and P2 for vertical deviations.

The optical path defined by the rays 44, 46, 48, 50, and 52 defines the optical null of the dual axes multiple prism optical system of the present invention. The optical path is inherently folded and provides an instrument of compact construction.

The mirror 36 is rotatable about the mutually orthogonal axes 38 and 40. Whenever light is normally incident to the reflecting surface of the mirror 36, the mirror 36 reflects the light back upon itself in the direction of the ray 44. In turn, the light is deviated by total internal reflection along the instrument null path. Deviations from null occasioned by the rotation of the reflecting surface 36 about the orthogonal axes 38 and 40 are detected by a light collection subsystem, described below, mounted to corresponding ones of the prisms P1, P2, P3, and P4 which detect light transmitted through the hypotenuse faces from lost total internal reflection.

Referring now to FIG. 3A, generally designated at 60 is a perspective view of a light collection subsystem of the multiple prism optical system of the present invention. An end array matrix 62 of fiberoptic cables is mounted to an edge of a prism 64 where the hypotenuse face joins one of the side faces. As can be seen in FIG. 3B, the ends of respective ones of the plurality of fiberoptic cables 66 are constrained to lie in a plane 67 substantially perpendicular to the plane of the hypotenuse face of the prism 64. The end array matrix of fiberoptic cables is as high as the prism is high and has a width selected to subtend the grazing angle for light refracted out of the hypotenuse face. It is to be noted that other suitable light collection subsystems may be employed without departing from the inventive concept.

The plurality of fiberoptic cables are connected to any suitable spacially removed light detector 68. The detector 68 may comprise a conventional photodetector operative to provide a signal proportional to the intensity of incident light. The detector 68 can be positioned in this manner at a region remote from the instrument itself to provide thermal isolation thereof. The prisms P1, P2, P3, and P4 are each provided on corresponding edges 70, 72, 74 and 76 with the light collection subsystem 60 of the present invention and corresponding light detectors 68, the outputs of which can be combined in a unit 69 operative to indicate total horizontal and vertical deviation.

Referring now to FIG. 4, generally shown at 78 is a schematic diagram of the intensity stabilized light source and detector of the optical system of the present invention. The intensity stabilized light source and detector 78 includes a light source 80, such as a light emitting diode, providing a diverging cone of light. A beam splitter 82 is positioned in the optical path of the light emitted by the light source 80 and splits a part of the light therefrom to an intensity detector 84. Another part of the emitted light is split to a lens 86. As illustrated by the dashed line 90, the intensity detector 84 is operatively connected to the light source 80 to stablize the intensity of the light source against variations introduced by LED aging and other factors. The lens 86 has such a geometry that the diverging rays incident thereon from the light source 80 are converted into parallel, collimated rays at the lens aperture.

Figure 5:
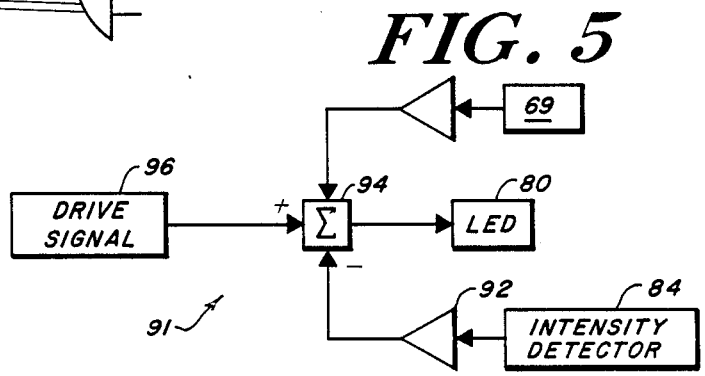
FIG. 5 shows a schematic diagram of the intensity control subsystem of the intensity stabilized light source and intensity detector of FIG. 4.

Referring now to FIG. 5, generally shown at 91 is a schematic of the intensity control subsystem of the intensity stabilized light source and detector of the optical system of the present invention. The intensity detector 84 produces a signal whose amplitude is proportional to the intensity of the light incident thereon. This signal is amplified in a gain amplifier 92. A summing network 94 is operative to sum the amplified signal produced by the intensity detector 84 and the signal produced by unit 69, and the signal 96 produced by the drive for the light source 80. Changes in the intensity of the light source occasioned by aging and other such factors are thereby automatically compensated. The intensity control subsystem of the intensity stabilized light source and detector of the present invention also adapts the magnitude of the light source drive signal to variations introduced in the intensity thereof occasioned by such factors as fluctuations in the atmospheric transmission medium, by fluctuations in the transmitivity of the optical medium itself, and fluctuations occasioned by changes in the reflectivity of the reflective surface of the mirror resulting from soot, dirt, dust, and other such contaminants. The intensity control substystem 90 also automatically compensates for intensity variations introduced by changes in the distance of the mirror from the autocollimator and for changes in the relative spot size of the light from the mirror. It is to be noted that in applications where the speed of signal processing is not critical, the signals produced by the light collection subsystems of each of the four prisms can be suitably averaged and compensated without the use of the intensity control subsystem 91 above described.

In the operation of the autocollimator embodiment of the multiple prism optical system of the present invention, whenever the mirror 36 is coplanar with the plane defined by the orthogonal axes 38 and 40, the light incident upon the surface of the mirror 36 is reflected back along the path of the ray 44 and is totally internally reflected through the prisms P1, P2, P3, and P4 and is directed in the direction of the ray 52 into the intensity stablized collimated light source 30. The intensity produced by the intensity detector 84 (FIG. 4) corresponds in this case to the reference or null intensity. Any variation away from null in the intensity of the signal produced by the intensity detector 84 is automatically compensated by the intensity control subsystem above described to provide an intensity stabilized light source.

In the case where the mirror 36 has a position that corresponds to a clockwise rotation about the axis 38, the light incident thereon is reflected therefrom at an angle which corresponds to the angle of rotation of the mirror about the axis 38. The reflected ray is incident on the hypotenuse face of the prism P1 at an angle of incidence to the normal thereto which is at or greater than the critical angle and is thus totally internally reflected therethrough and deviated 90° in the direction of the prism P2. The ray strikes the hypotenuse face of the prism P3 at an angle of incidence to the normal which is at or greater than the critical angle and is likewise totally internally reflected and deviated in the direction of the prism P3.

However, the light incident on the hypotenuse face of the prism P3 is at an angle of incidence to the normal which is less than the critical angle by an amount which corresponds to the clockwise angle of rotation of the mirror 36 about the axis 38. In this instance, the ray is partially reflected from the hypotensue face and partially refracted therethrough. The refracted portion of the ray is collected by the end array matrix of fiberoptic cables of the light gathering subsystem 60 (FIG. 3) positioned along the edge 74. The intensity of the refracted light corresponds to the degree by which the incident light differs from the critical angle of incidence. The light detector associated with the prism P3 is responsive to the refracted portion of the light and provides an indication of a plus azimuthal variation in the position of the mirror. The reflected portion of the light is deviated by the prism P3 in the direction of the prism P4 and strikes the hypotenuse face at an angle of incidence to the normal which is at or greater than the critical angle and is totally internally reflected into the intensity stabilized source 30 and detector of the multiple prism optical system of the present invention.

In a like manner, wherever a rotation of the mirror 36 is in a direction counterclockwise about the axis 38, the ray reflected therefrom is reflected through the prisms P1, P2, and P3, but is partially refracted and partially reflected through the prism P4. The refracted portion is detected by the light detection system of the present invention positioned about the edge 76 thereof. Prism P4 and associated detector thus provides an indication of the minus azimuthal variation about the optical axis of the instrument which corresponds to the counterclockwise angle of rotation of the mirror 36 about the axis 38.

Whenever the mirror 36 position is such as to correspond to a clockwise angle of rotation about the axis 40, the light is reflected therefrom at an angle which corresponds to the degree of rotation and strikes the hypotenuse face of the prism P1 at an angle to the normal thereof at or greater than the critical angle and is thereby totally internally reflected and deviated 90° to the prism P2. In this case, however, the light is incident to the hypotenuse face of the prism P2 at an angle to the normal which is less than the critical angle. The light is partially refracted through the hypotenuse face and collected by the light collection subsystem positioned on the edge 72. The reflected portion is deviated in the direction of the prism P3 and from there to the prism P4. Like the prism pair P3 and P4 used for azimuthal detection, the magnitude of the intensity of the refracted light collected by the fiberoptic cables of the light collection subsystems for the prism pair P1 and P2 corresponds to the angular degree of angular deviation of the mirror 36 about the axis 40 and respectively represents the minus and plus rotations of the mirror about the elevational axis.

The multiple prism optical system of the present invention in the autocollimator mode is capable of a highly sensitive and accurate establishment of the null position and enables precise identification of variation along the two orthgonal axes 38 and 40 for angular deviations near to the null position. Whenever the angular deviation of the mirror about the two axis is beyond the small angle sensitivety region of the optical system, the signals produced by corresponding ones of the azimuthal and elevational prisms are of a comparatively high magnitude which signals an indication of off-null position and calls for a realignment either of the mirror or of the instrument.

Figure 6:
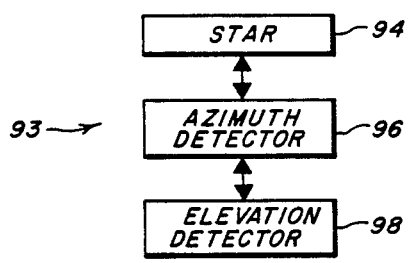
FIG. 6 shows a block diagram of the multiple prism optical system of the present invention in a directionally sensitive light detector mode.

Referring now to FIG. 6, generally shown at 93 is a block diagram of the directionally sensitive light detector embodiment of the multiple prism optical system of the present invention for tracking the angular position about two orthogonal axes of a celestial body such as a star or other light source. The star tracker embodiment is substantially the same as the autocollimator embodiment except for the removal of the light reflecting surface 36 (FIG. 2) and the removal of the collimator 30 (FIG. 2). In the embodiment of FIG. 6, the luminous object 94 to be tracked itself provides a collimated beam of light. The directionally sensitive light detector 92 is operative to detect the angular deviation of the collimated light relative to the optical null of the instrument. An azimuthal variation detector 96 is responsive to the incident substantially parallel rays and operative to provide an indication of plus and minus variations of the light about the azimuthal plane about the optical null. An elevational variation detector 98 is responsive to the incident light and operative to provide an indication of plus and minus variations of the light about the elevational plane of the optical null.

Figure 7:
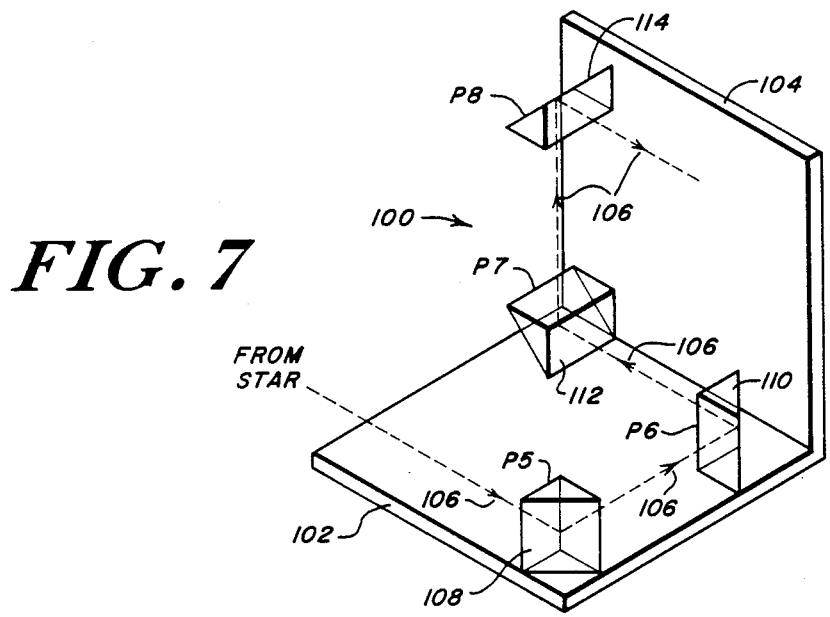
FIG. 7 shows a simplified perspective view of the FIG. 6 embodiment of the optical angle measuring system of the present invention.

Referring now to FIG. 7, generally shown at 100 is a simplified perspective view of an embodiment of the multiple prism optical system of the present invention used in a star tracking mode. The star tracker 100 comprises first and second 45°-90° prism pairs P5, P6, and P7, and P8, mounted to respective orthogonally positioned substrates 102 and 104 such that collimated light of a given wavelength is incident on corresponding ones of the prisms at the critical angle and is totally internally reflected therethrough about the optical null 106 of the instrument. The light detection subsystem 60 shown in FIG. 3 is mounted to the edges 108, 110, 112, and 114 of the prisms P5, P6, P7 and P8. In the embodiment illustrated in FIG. 7, the light detectors associated with each of the azimuthal and elevational prism pairs produce output signals in dependance upon the relative elevational and azimuthal orientation of the instrument 100 about the instrument null in a manner substantially identical to that described above in connection with the embodiment of the multiple prism optical system of the present invention described with reference to FIGS. 1 and 2.

It will be appreciated that many modifications of the presently disclosed invention may be effected without departing from the scope of apended claims.

What is claimed is:

1. A dual axes multiple prism optical system, comprising:
    first and second 45°-90° prisms mounted in spaced apart relation with the hypotenuse face of each in planes nearly normal to each other and mutually normal to a first plane such that a ray of light at a predetermined wavelength in a direction selected to establish a reference is incident to the normal of the hypotenuse face of said first prism at the critical angle for said light at said predetermined wavelength and is deviated therefrom by total internal reflection in the direction of said second prism and is incident to the normal of the hypotenuse face of said second prism at the critical angle and is deviated therefrom by total internal reflection, any deviation of said ray in a plane parallel to said first plane causing opposite variations in reflection and refraction at the hypotenuse of said first and second prisms;
    third and fourth 45°-90° prisms mounted in spaced apart relation with the hypotenuse face of each in planes nearly normal to each other and mutually normal to a second plane such that said ray of light totally internally reflected and deviated by said second prism is incident to the normal of the hypotenuse face of said third prism at the critical angle and is totally internally reflected therefrom in the direction of said fourth prism and is incident to the normal of the hypotenuse face of said fourth prism at the critical angle and is totally internally reflected therethrough, any deviation of said ray in a plane parallel to said second plane causing opposite variations in reflection and refraction at the hypotenuse face of said third and fourth prisms; and
    means associated with each of said prisms for providing a signal indication of light refracted through the hypotenuse faces of corresponding ones of said prisms.

2. The dual axes multiple prism optical system of claim 1, wherein said ray of light at said predetermined wavelength is provided by a collimator.

3. The dual axes multiple prism optical system of claim 2, further including second means cooperative with said collimator for stablizing the intensity of said ray of light at said predetermined wavelength against fluctuations.

4. The dual axes multiple prism optical system of claim 3, wherein said collimator includes a light source having a drive, and wherein said second means includes a beam splitter operative to split a portion of the light produced by said light source onto an intensity detector, and further including a summing network responsive to said signal produced by said drive and response to the sum of the prism signal indications and to the signal produced by said intensity detector and operative to stabilize the intensity of said light against fluctuations.

5. The dual axes multiple prism optical system of claim 1, wherein said signal indication providing means includes a plurality of fiberoptic cables the ends of each positioned to receive light refracted through the hypotenuse face of a corresponding prism.

6. The dual axes multiple prism optical system of claim 5, further including light detector means operatively connected to said plurality of fiberoptic cables to indicate the intensity of light guided by said cables.

7. A dual axes multiple prism optical system as recited in claim 1, wherein said ray of light at said predetermined wavelength is produced by a specially remote collimated light source.

8. The dual axes multiple prism optical system of claim 7, wherein said specially remote collimated light source is a luminous celestial body.

* * * * *